July 14, 1964 J. P. RUTLEDGE 3,140,538
METHOD OF FORMING A BRAZED JOINT
Original Filed Jan. 20, 1960
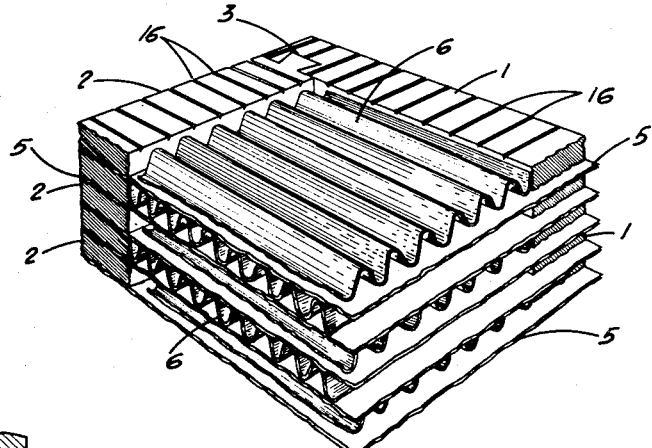
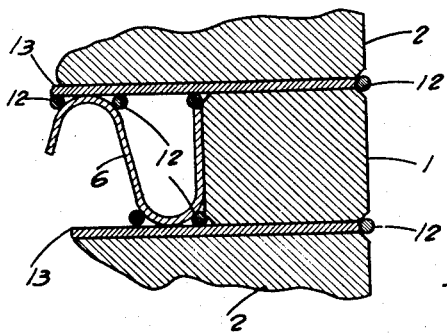
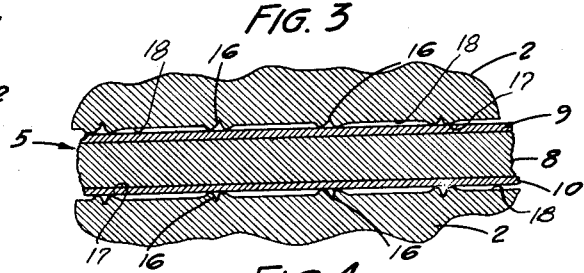
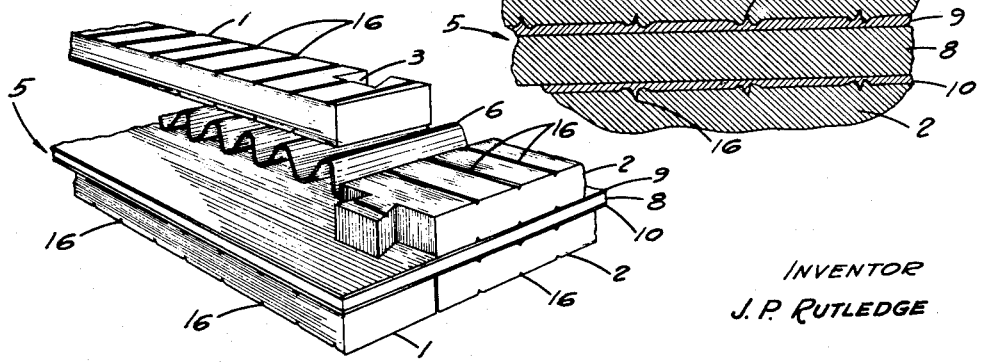
INVENTOR
J. P. RUTLEDGE
By A. G. Douvas
ATTORNEY United States Patent Office 3,140,538
Patented July 14, 1964

3,140,538
METHOD OF FORMING A BRAZED JOINT
Joseph P. Rutledge, Indianapolis, Ind., assignor to Stewart-Warner Corporation, Chicago, Ill., a corporation of Virginia
Original application Jan. 20, 1960, Ser. No. 3,652. Divided and this application Oct. 27, 1960, Ser. No. 65,352
8 Claims. (Cl. 29—482)

This invention relates to a method of brazing and to joints and structures in which the method is employed.

This application is a division of my copending application Serial No. 3,652, filed January 20, 1960.

Heretofore the width or depth of particular brazed joints, as hereinafter set forth in detail, have been greatly limited, the maximum in the case of aluminum being 3/16 to 1/4 of an inch. It is quite obvious that such a limitation has not permitted the fabrication of very heavy or strong structures.

Accordingly, a primary object of the invention is to provide a method of brazing by the dip process in which the joint is of greatly increased width or depth over that heretofore possible.

Another object is to provide a method of brazing by the dip process whereby much stronger and heavier structures can be produced than previously possible.

Another object is to provide a method of producing heat exchanger cores of heavier construction which do not require an outer casing or structure and to which headers and other parts can be welded directly without destroying the brazed joints or requiring the use of intermediate and expensive structure.

Another object is to produce a heat exchanger construction of greatly reduced cost.

Other objects and advantages of the invention will appear from the following description, read in conjunction with the accompanying drawings in which:

FIG. 1 is a perspective view of a fragmentary portion of a heat exchanger core prior to immersion in a molten flux bath with the top plate omitted;

FIG. 2 shows an enlarged fragmentary portion of the heat exchanger core of FIG. 1, one part thereof being illustrated in an exploded relation to the other parts;

FIG. 3 is a more greatly enlarged fragmentary showing of a pair of side bar members with an interposed brazing sheet prior to actual brazing and with the spaced discontinuities greatly exaggerated;

FIG. 4 is a view similar to FIG. 3 showing the parts after completion of the brazing process; and FIG. 5 is an enlarged fragmentary view illustrating the use of brazing wire in lieu of the clad sheet of FIGS. 1 to 4.

Referring to the drawing figures in detail, 1 and 2 are side bars of the heat exchanger core, being connected at the corners by dovetail joints 3. Other side bar members (not shown) are employed opposite members 1 and 2 to form rectangular outer frame portions of the heat exchanger core. Suitable openings or interruptions (not shown) are provided in the frame portions for ingress and egress of fluid passing through the exchanger. The side bar members of each frame portion or layer are positioned along associated edges of plate members 5. Heat exchanger fin members 6 of corrugated form are also placed on plates 5 in proper position within the side bar members. The fin members run in the same or different direction in adjacent layers. To complete the core construction, a top plate (not shown) is placed above the upper members 1 and 2.

FIGS. 2 and 3 show the makeup of the brazing plates or sheets 5 of FIG. 1. These sheets constitute a center portion 8 and upper and lower layers 9 and 10 of brazing filler alloy. The center portion 8 consists of substantially pure aluminum or of aluminum alloy, as is also the case with the other parts of the exchanger core. The two most commonly employed brazing alloys for the layers 9 and 10 consist of 6.8 to 8.2% silicon, .25% copper, .80% iron, .2% zinc with the remainder of aluminum, and 11 to 13% silicon, .3% copper, .8% iron, .2% zinc, .1% magnesium, .15% manganese with the remainder aluminum. The latter alloy is also commonly employed for brazing wire as 12 in FIG. 5. Considering all brazing alloys that can be used for either cladding, as shown in FIGS. 2 through 4, or wire, as shown in FIG. 5, they would have the following constituents within the ranges indicated: 4 to 13% silicon, .25 to 4.7% copper, .8% iron, and from .1 to 10.5% zinc.

The melting points of the various parent metals such as constitute layer 8 in FIGS. 2 through 4, the entire plates 13 of FIG. 5, and the rest of the components of the exchanger core range from approximately 1025 to 1215° F. with the melting range of the preferred parent metal being from 1190 to 1210° F. The approximate melting range for the brazing filler alloy is from 960 to 1165° F. The melting points for the two commonly employed and preferred brazing filler alloys, previously mentioned, range from approximately 1070 to 1135° F. and from 1070 to 1080° F., respectively.

In accordance with the dip process of brazing the components to be brazed are held together by suitable means and immersed in a bath of molten brazing flux. The composition of the preferred flux is 4 to 6% lithium chloride and 54 to 58% aluminum fluoride, with 110 lbs. of dry flux required for a cubic foot of liquid. The approximate melting range of the flux is from 900 to 1033° F. The functions of the molten flux or salt bath are of course to deoxidize all surfaces to be brazed, provide a means of heating the constituent parts to be brazed, and prevent reoxidization of these parts while submerged in the molten bath.

The brazing alloy need not be employed in the form of clad layers 9 and 10 on parent metal 8 but may be used in the form of foil or powder, made into a paste and brushed on the upper and lower surfaces of the plate to be brazed, or wire. The use of foil or powder is necessary where plates to be brazed are of thicknesses which are not provided with cladding. The use of wire is illustrated in FIG. 5 wherein wires 12 are held in position along the junctures of side bar members 1 and 2, and plates 13, the latter being entirely of parent metal. Additional wires 12 are also placed at the upper and lower junctures of the fins with the plates 13, as clearly indicated in the figure.

In accordance with dip brazing, upon immersion of the component parts in the hot flux bath and the resultant heating of these parts up to brazing temperature, the brazing alloy forming either the clad layers, foil, powder or wire melts and flows between the members being brazed. Prior to the flowing of the brazing alloy, the flux has deoxidized and cleaned the surfaces to be brazed.

As mentioned in the preamble of the specification, the width of aluminum members, such as side bars 1 and 2, which heretofore have been brazable by the dip process, has been limited to 3/16 of an inch to 1/4 of an inch. In accordance with the present invention, members of many times greater width may be brazed. For instance, the side bar members of the heat exchanger core illustrated are 3/4 of an inch wide. Still wider members may be effectively brazed according to the invention, even up to widths of several inches.

In accordance with the preferred form of the invention, spaced, local discontinuities are provided along the interface, or face to be brazed, of the side bar members, as shown. These discontinuities are shown on both sides or interfaces of the bar members and are in the form of grooves 16 below the surface each flanked by adjacent ridges 17 above the surface. Further, the discontinuities are shown to extend across the width of the side bars normal to the inner and outer parallel edges of the members. The discontinuities are formed by any suitable means as by striking or pressing the grooves 16 below the normal contour of the surface, and as exaggerated in FIGS. 3 and 4, to cause thereby the slight amount of material or ridges 17 to be raised above the normal surfaces. The depth of these grooves for use on the heat exchanger core side bars is of the order of .005 of an inch. The equal center line spacing of these grooves for the same use is of the order of 3/16 of an inch. Although the opposite interfaces of the bar members are flat and parallel, matching the flat interfaces of the plates 5 with the plate 2 having the discontinuities defines a plurality of channels or valley spaces 18 between the adjacent discontinuities and the spaced surfaces.

The function of these discontinuities is to provide channels for the flow of flux to all parts of the surfaces to be brazed to assure a good brazed joint throughout the entire extent thereof. The spacing and/or depth of these grooves and channels would vary according to the width of the members to be brazed, the cardinal requirement being that the grooves and channels permit flux flow throughout the entire area of the interfaces while the parts to be brazed are stacked solid on the ridges 17 during the course of the process. It is also pointed out that the depth of the grooves and channels must not be so great that cladding or other forms of brazing alloy cannot entirely fill the same during the brazing process. Stating it another way, the amount of brazing alloy, in whatever form it is used, must be sufficient to entirely fill the grooves and channels to form a brazing filler throughout the entire extent of the interfaces to be brazed.

The grooves and channels preferably run normal to the edges of the side bars 1 and 2 because this forms the shortest route for the inflowing flux to assure more uniform and thorough coverage of the interfaces by the flux for a given spacing between the surfaces. Thus, although the discontinuities are shown running across the bars normal to the longitudinal edges thereof, they do not necessarily have to run this way. For instance, where it is desired to braze a component which is relatively short, a single groove or several discontinuities may be formed along the length of the member rather than across the same, if desired. Even though the discontinuities are shown extending entirely across the side bar members, it may be necessary or otherwise desired in other brazed joints to have each discontinuity extend from only one side or end.

While the brazing of longitudinal surfaces of members has been described in connection with the present invention, the brazing of end surfaces of greater width and/or depth than heretofore known is also possible under the invention by the use of one or more discontinuities suitably disposed.

It is appreciated that by the use of much wider side bar members 1 and 2 for the heat exchanger core a great deal more strength is had by the frame members forming the core than has heretofore been possible with the exceedingly thin edge members. Also, and of greatest significance, header members and other parts may be welded directly to the heat exchanger core employing the present process without destroying the brazed joints or otherwise damaging the core. This is for the reason that the heavier side bar construction rapidly conducts away the heat in excess of the melting point of the brazing metal during the welding process so as not to melt the brazed joints in the area of the welding. Further, because of increased strength of the core employing the present process, an outer casing is not necessary which, together with the direct welding of the header and other members rather than the previous practice of employing additional intermediate members, greatly reduces the overall cost of heat exchanger constructions.

Although a heat exchanger core and specific groove spacing, depth, and disposition has been disclosed, it is not desired to be so limited. The invention is accordingly applicable to brazed joints and similar methods of joining metal members generally. It is accordingly desired to be limited only by the terms of the appended claims read in the light of the broad spirit of the invention.

What is claimed is:

1. The method of joining two metal components by brazing substantially complementary surfaces thereof, comprising the steps of indenting at least one of the surfaces to be brazed with one or more indentions extending across the surface and causing localized projections adjacent each of the indentions raised from the normal contour of the surface, bringing the surfaces of the components which are to be brazed together into close proximity to each other and the brazing filler metal until the projections abut forming a solid stacked assembly, and heating the components and filler metal at least to the melting point of the filler metal by dipping the components with the filler metal into a molten flux bath to cause the filler metal to flow between the surfaces remote of the projections held apart by the projections abutting the opposite surface into brazing engagement and condition with the component surfaces.

2. A method of brazing a stacked heat exchanger core having at least two metal bar components adapted to be stacked on opposite sides of a thin separator plate, the bar components each having a width of the order of 3/4", the method comprising the steps of nicking one or more grooves in the surface to be brazed of at least one of the bar components and extending across the width of the bar component substantially normal to the edges thereof and forming projections adjacent each groove raised from the normal surface a few thousandths of an inch, bringing the surfaces of the components which are to be brazed together at least into close proximity to each other such as to be maintained spaced apart remote of the projections and stacked solid at the projections and having the brazing filler metal at least adjacent the surfaces to be brazed together, and heating the components and filler metal at least to the melting point of the filler metal by dipping the components with the filler metal into a molten flux bath to cause the filler metal to flow between the spaced surfaces into brazing engagement and condition with the component surfaces.

3. The method of joining two metal components by brazing comprising the steps of nicking one or more grooves in the surface to be brazed of at least one of the components, the grooves extending from at least adjacent one edge of the surface and forming projections adjacent each groove raised from the normal contour of the surface by a few thousandths of an inch, bringing the surfaces of the components which are to be brazed together into contact with each other and the brazing filler metal at the projections to form a solid stacked assembly while maintaining the surfaces remote from the projections spaced apart and open to the edges of the surfaces, and heating the components and filler metal at least to the melting point of the filler metal by dipping the components with the filler metal into a molten flux bath to cause the filler metal to flow between the spaced surfaces into brazing engagement and condition with the component surfaces.

4. A method of brazing together two metal components complementary with one another along surfaces which are at least of the order of 3/4 of an inch wide, the process comprising the steps of indenting substantially equally spaced parallel fine grooves in the surface to be brazed of the component of 3/4 inch width, the grooves extending across the width of the 3/4 inch wide component and substantially normal to the edges of the surface to be brazed, the center line spacing of the grooves being of the order of 3/16 of an inch and the depth of the grooves being of the order of .005 of an inch and forming projections adjacent each groove raised from the normal contour of the surface a few thousandths of an inch, bringing the surfaces of the components which are to be brazed together at least into close proximity to each other and to the brazing filler metal until abutment of the projections form a solid assembly at the projections while maintaining the surfaces spaced from the projections spaced apart and open to the edges of the surfaces, and heating the components and filler metal at least to the melting point of the filler metal by dipping the components with the filler metal into a molten flux bath to cause the filler metal to flow between the spaced surfaces into brazing engagement and condition with the component surfaces.

5. The method of joining together by brazing two brazable metal components of independent thickness on complementary surfaces of generally independent width, comprising the steps of indenting at spaced locations the normal contour of at least one of the surfaces with a plurality of fine indentions of depth of the order of a few thousandths of an inch and each forming thereby at least one adjacent projection raised from the normal contour of the surface of height of a few thousandths of an inch; bringing the components, including a brazing filler metal therebetween, together until abutment to form a solid stacked assembly, with the brazing filler metal then being proximate the surfaces to be brazed, and valley spaces being defined between the projections and the surfaces open to the edges of the surfaces; and dipping the components and filler metal into a molten flux bath at a temperature in excess of the melting point of the filler metal to cause the filler metal to flow into brazed relationship with the surfaces.

6. The method of joining together by brazing two brazable metal components of independent thickness on complementary surfaces of generally independent width, comprising the steps of indenting at spaced locations at least one of the surfaces with a plurality of fine indentions of depth below the normal contour of the surface of the order of a few thousandths of an inch and each forming thereby at least one adjacent projection raised above the normal contour of the surface of height of a few thousandths of an inch; bringing the components, including a brazing filler metal coated on either or both of the surfaces, together until the projections abut the other component to form a solid stacked assembly, whereat the surfaces which are to be brazed are in close proximity to each other but spaced apart across valley spaces defined between the projections, with the brazing filler metal being proximate the surfaces and of volume sufficient upon brazing to fill the valley spaces while maintaining before the brazing thereof the valley spaces open to the edges of the surface; and dipping the components and filler metal into a molten flux bath to raise the temperatures thereof at least to the melting point of the filler metal to cause the filler metal to flow between the surfaces into brazed relationship with the surfaces.

7. The method of joining together by brazing two brazable metal components of independent thickness on complementary surfaces of generally independent width, comprising the steps of indenting at spaced apart locations of the order of $3/16''$ at least one of the surfaces with a plurality of fine indentions of depth below the normal contour of the surface of the order of a few thousandths of an inch and each forming thereby at least one adjacent projection raised above the normal contour of the surface of height of a few thousandths of an inch; bringing the components together until the projections abut the other component to form a solid stacked assembly, whereat the surfaces to be brazed are in close proximity to each other but spaced apart across valley spaces defined between the projections, with a brazing filler metal being proximate the surfaces to be brazed of volume sufficient upon brazing to fill the valley spaces while maintaining before the brazing thereof the valley spaces open to the edges of the surface; and dipping the components and filler metal into a molten flux bath to raise the temperatures thereof at least to the melting point of the filler metal to cause the filler metal to flow within the valley spaces into brazed relationship with the component surfaces.

8. The method of joining together by brazing two brazable metal components of independent thickness on complementary surfaces of generally independent width, at least one surface of which is coated with a brazing filler metal, comprising the steps of indenting at locations spaced apart of the order of $3/16''$ at least one of the surfaces with a plurality of fine indentions approximately .005'' deep and each forming thereby at least one adjacent projection raised above the normal contour of the surface of height of a few thousandths of an inch; bringing the components together until the projections abut the other component to form a solid stacked assembly, whereat the portions of the surfaces which are to be brazed remote of the projections are in close proximity to each other but spaced apart a distance of the order of a few thousandths of an inch and open to the edges of the surfaces; and dipping the components and filler metal into a molten flux bath to raise the temperatures thereof at least to the melting point of the filler metal to cause the filler metal to flow between the surfaces in brazed relationship with the component surfaces, with the brazing filler metal being of volume sufficient to fill the spaces upon brazing and form a solid cross-section.

References Cited in the file of this patent

UNITED STATES PATENTS

| | | |
|---|---|---|
| 2,274,550 | Karmazin | Feb. 24, 1942 |
| 2,375,661 | Karmazin | May 8, 1945 |
| 2,723,449 | Miller | Nov. 15, 1955 |
| 3,012,317 | Wolfe | Dec. 12, 1961 |
| 3,069,766 | Rush | Dec. 25, 1962 |